United States Patent [19]

Nowak

[11] Patent Number: 4,820,346
[45] Date of Patent: Apr. 11, 1989

[54] INK JET PRINTER INK

[75] Inventor: Michael T. Nowak, Gardner, Mass.

[73] Assignee: Howtek, Inc., Hudson, N.H.

[21] Appl. No.: 33,040

[22] Filed: Mar. 31, 1987

Related U.S. Application Data

[63] Continuation-in-part of Ser. No. 748,768, Jun. 25, 1985, abandoned.

[51] Int. Cl.$^4$ ............................................. C09D 11/00
[52] U.S. Cl. ........................................ 106/22; 106/20; 106/30; 523/160; 524/167; 524/168
[58] Field of Search ............................. 106/30, 20, 22; 523/160; 524/167, 168

[56] References Cited

U.S. PATENT DOCUMENTS

| | | | |
|---|---|---|---|
| 3,944,695 | 3/1976 | Kosaka et al. | 428/200 |
| 4,218,362 | 8/1980 | Honjo et al. | 260/40 R |
| 4,390,369 | 6/1983 | Merritt et al. | 106/31 |

FOREIGN PATENT DOCUMENTS

| | | |
|---|---|---|
| 1245187 | 9/1971 | United Kingdom . |
| 1498592 | 1/1978 | United Kingdom . |
| 1510560 | 5/1978 | United Kingdom . |

OTHER PUBLICATIONS

Derwent Abstract Accession No. 68-33641P/00, Netherlands patent No. NL6509119, Jan. 14, 1967.
Derwent Abstract Accession No. 77-15308y/09, Japanese patent No. J52006207, Jan. 18, 1977.
Derwent Abstract Accession No. 85-193223/32, Japanese Patent No. J60120093, Jun. 27, 1985.
Derwent Abstract Accession No. 86-234545/36, Japanese Patent No. J61162387, Jul. 23, 1986.

*Primary Examiner*—Amelia Burgess Yarbrough
*Attorney, Agent, or Firm*—Nutter, McClennen & Fish

[57] ABSTRACT

A hot-melt ink for an ink jet printer is formed from a solid organic solvent having a melting point less than 150° C. and a low molecular weight thermosetting resin having a high hydroxyl number, together with a dye. The ink has excellent jetting characteristics, forms a hard, stable print raised above the surface of the substrate, provides high dot resolution, and remains colorfast both in the ink jet printer and on the paper, even when exposed to continued high temperatures. It is non-toxic and odorless, and eminently suitable for office document preparation and other applications. In a preferred embodiment, the inks comprise color subtractive dyes, making them suitable for use in multi-color printing.

25 Claims, No Drawings

INK JET PRINTER INK

RELATED APPLICATIONS

This is a continuation-in-part of U.S. patent application Ser. No. 748,768, filed June 25, 1985, now abandoned.

BACKGROUND OF THE INVENTION

A. Field of the Invention

The invention relates to printing inks for ink jet printers, and, more particularly, to a solid, hot-melt ink that is suitable for subtractive color ink jet printing.

B. Prior Art

Inks that are to be utilized in document printing by ink jet application are subject to demanding and frequently conflicting limitations.

The first is that imposed by the substrate itself, which is typically a fibrous material (e.g. paper) when viewed on a microscopic level. On such a substrate, ink that is applied to it must not soak in and spread or "bleed" excessively, lest the sharpness of the image be unacceptably reduced. As an example of the degree of sharpness required, current applications require a resolution on the order of 240×400 (i.e. 240 dots per inch in the horizontal direction, and 400 dots per inch in the vertical direction) for text printing. High quality graphics printing may require resolutions extending up to 600 dots per inch. Further, the ink must be resistant to abrasion, as well as to inadvertant transfer to adjacent materials. Additionally, since the document may be carried through a variety of climates, the ink must remain stable at temperatures ranging from —20° C. to +70° C. These restrictions are fairly severe when applied to black ink, but are even more severe when applied to colored inks, since even minor changes in color are frequently noticeable.

In the case of inks that are to be applied by ink jet techniques, the problem is even further compounded by the requirement that the inks be compatible with jetting requirements of the printer. Typically, this application imposes restrictions on, for example, the viscosity of the inks, so that the inks can be expelled from the jet as relatively uniform droplets without excessive satelliting. Furthermore, the inks must be stable at operating temperatures as high as 150° C. or even 175° C. Additionally, the constituents must all be compatible with each other, both physically (i.e. capable of forming a solution which can be jetted successfully) and chemically (i.e. not adversely affecting the stability or other characteristics of the materials).

Most of the inks heretofore utilized in ink jet printers have been aqueous solutions of water-soluble dyes. Examples of such inks are described in U.S. Pat. No. 3,846,141, issued Nov. 5, 1974 to D. G. Ostergren et al, and U.S. Pat. No. 4,512,807 issued Apr. 23, 1985 to A. Ogawa et al. Inks of this type have been found acceptable for many applications, but do not have the desired hardness of the resultant print, nor the requisite stability and sharpness for fine color applications.

An example of a non-aqueous ink jet ink is described in U.S. Pat. No. 4,390,369, issued June 28, 1983 to A. R. Merritt et al. The ink described therein utilizes a natural wax which is liquefied by heating in order to jet it and which is thereafter solidified on contact with the substrate, e.g. paper. Among other drawbacks, however, the resultant material readily abrades and is thus unacceptable for most document purposes where some degree of print stability is required.

SUMMARY OF THE INVENTION

A. Objects of the Invention

Accordingly, it is an object of the invention to provide an improved ink for hot-melt ink jet printers.

Further, it is an object of the invention to provide such an ink that produces print with a sharp image of high resolution which is resistant to abrasion and relatively stable over a wide range of temperatures.

Yet another object of the invention is to provide such an ink which possesses good jetting characteristics and which is chemically and physically stable at high operating temperatures.

A further object of the present invention is to provide a printed document comprising a substrate and print produced from the present ink.

A still further object is to provide a method of printing comprising jetting the hot-melt ink of the present invention onto a substrate.

Another object is to provide apparatus for hot-melt ink jet printing, for use with the improved ink of the present invention, wherein the jet is formed from a heat-resistant polymer resin.

B. Brief Summary of the Invention

In accordance with the present invention, an ink jet printer ink is provided which comprises a mixture of a solid organic solvent, preferably with a melting point of less than 150° C., and a low molecular weight polymer resin. Preferably, the polymer resin has a high hydroxyl number and a low acid number, as discussed further below. The solid solvent preferably comprises one or more aromatic sulfonamides, with particularly good results being obtained with alkyl benzenesulfonamides. Preferably the mixture comprises about 60 to 95 w % (weight percent) of the solid solvent and about 5 to 40 w % of the polymer resin. The mixture may further comprise a relatively small amount (on the order of about 1 w % or less) of a temperature-stable dye. In a preferred embodiment of the invention, subtractive color dyes are provided for multi-color printing usage. Additional ingredients, such as antioxidant stabilizers, may also be included.

DETAILED DESCRIPTION OF THE INVENTION

The solid organic solvent of the present invention preferably has a melting point below 150° C. In a preferrred embodiment of the present invention, this solid solvent comprises one or more aromatic sulfonamides. In particular, primary alkyl ($C_1$–$C_9$) benzenesulfonamides have given excellent results. Particularly good results were obtained when the alkyl group was para to the sulfonamide group. One preferred solvent is a mixture of about 40 to 60 w % p-toluenesulfonamide (which can also be called p-methylbenzenesulfonamide) and about 60 to 40 w % p-ethylbenzenesulfonamide. Preferably, the solvent mixture also comprises up to about 5 w % of a $C_3$–$C_9$ alkylbenzenesulfonamide, with particularly good results being obtained using about 2 w % p-n-butylbenzenesulfonamide or about 2 w % p-n-nonylbenzenesulfonamide. Good results were also obtained using solvent mixtures of ortho- and para-toluenesulfonamide, such as that sold under the tradename "Santicizer 9" by the Monsanto Chemical Corportaion, as described more fully hereinafter.

The solid organic solvent component of the present invention is generally solid at room temperature but molten at the operating temperature of the ink jet printer. Operating temperatures for such hot-melt ink jet printers are generally below 150° C., so preferably the solid solvent also has a melting point below 150° C. However, higher melting point solvents could be used in correspondingly higher operating temperature printers.

The resin component of the ink mixture preferably comprises a polymer resin of relatively low molecular weight (i.e. less than about 10,000). A particularly preferred resin is a saturated thermosetting polyester resin with a high hydroxyl number and a low acid number. The hydroxyl number of such polymer resins is a measure of the number of —OH end groups in the resin, and is expressed as mg of KOH equivalent to 1 g of resin. The acid number is calculated on the same basis for the number of —COOH end groups. By "high hydroxyl number" is meant a hydroxyl number in excess of 50, and by "low acid number" is meant an acid number less than 10. From observation of this and other materials tested, it is believed that the presence of significant hydroxyl content provides substantial hydrogen bonding which maintains the integrity of individual droplets as they are expelled from the jet, despite the substantial temperature (on the order of 125° C.) and pressure to which they are subjected during expulsion. This results in ink droplets which are uniform and fine, and which are relatively free of satellites as they travel to the paper.

An excellent example of such a saturated polyester resin, which has been found especially satisfactory for use in the present invention, is sold under the tradename Desmophen 650 by Mobay Chemical Corporation. It is characterized as having a hydroxyl number in the range of 155–190, a molecular weight below 10,000, an acid number of not more than 3, an equivalent weight of about 325, and a specific gravity of about 1.17 at 20° C. Another polyester resin which was used is Aroplaz 642, a proprietary resin made by spencer Kellogg Products. It is characterized as having a softening point of 85°–95° C. and an acid value of 10 max.

Good results were also obtained using RJ-100 and RJ-101 resinous polyols produced by Monsanto. These are identified as styrene-allyl alcohol copolymers, and, according to the manufacturer's specifications, have low molecular weights and high hydroxyl numbers. In particular, RJ-100 is characterized as having a hydroxyl number of about 187, a molecular weight of 1600 (number average) or 2340 (weight average), an equivalent weight of about 300, a softening point of 100°–110° C., and a specific gravity of 1.055. RJ-101 is characterized as having a hydroxyl number of about 255, a molecular weight of 1150 (no. avg.) or 1700 (wt. avg.), an equivalent weight of about 220, a softening point of 95°–105° C., and a specific gravity of 1.094.

EXAMPLE I

A mixture was formed by adding 10 parts by weight of Desmophen 650 to 90 parts by weight of Santicizer 9 to form a base for dye. A stabilizer in the form of a phosphite antioxidant (approximately 2 w %) was then added. The particular stabilizer used was Ultranox 626 antioxidant, made by Borg-Warner Chemicals, Inc. A magenta subtractive ink was then formed by adding to the mixture 0.75 parts by weight of Atlantic Atlasol Magenta M (Solvent Red 49). Similarly, yellow and blue inks for subtractive color printing, and black ink were obtained by adding to seperate batches of the base mixture 0.6 parts by weight of Atlantic Atlasol Yellow BB (Solvent Yellow 42), 0.4 parts by weight of Ciba Geigy Orasol Blue GN (Solvent Blue 67), and 2.0 parts by weight of Sandoz Savinyl Black RLS (Solvent Black 45), respectively.

Santicizer 9 is a proprietary mixture of ortho- and para-toluenesulfonamide manufactured by Monsanto Company. It may be characterized as having a molecular weight of 171, a melting point of about 105° C. (beginning of softening range), a crystallizing point of about 105° C., a boiling point of about 214° C., and a specific gravity of about 1.353 at 25° C. It is generally acidic in nature, with a minimum pH of about 4, and is generally non-toxic with essentially no odor.

Preferably, the hot-melt inks of the present invention should have viscosities within the range of about 5 to 30 centipoise at jetting temperatures. The inks of this example all had viscosities well within this desired range, and, specifically, their viscosities were all approximately 17 centipoise. They jetted consistently without significant satelliting. They did not clog the jets even when left in them for extended periods of time at the jetting temperature, and remained stable in the jet printer at a temperature of 150° C. for weeks.

The resultant mixtures were jetted onto a paper substrate through plastic jets having diameters of on the order of 0.03 inches (0.76 cm) at frequencies up to in excess of 10,000 Hertz and at a temperature of on the order of 125° C. They dried quickly on the surface of the paper. The print copy so formed was characterized by a raised texture similar to engraving, and by excellent dot resolution and sharpness. The print was hard and resistant to abrasion, as well as to transfer from document to document. The color remained stable, without appreciable color shift, even when subjected to elevated temperatures for a week.

EXAMPLE II

Additional ink formulations were made using a variety of sulfonamides and combinations of sulfonamides. In all of the following examples, Desmophen 650 polyester resin comprised the resin component, while the solid solvent component was varied. Various commercially available dyes, a discussed below, were used in combination with the different ink formulations. In the following table, all amounts are given in parts by weight:

|  | Ex | | | |
| --- | --- | --- | --- | --- |
|  | II-A | II-B | II-C | II-D |
| p-toluenesulfonamide | 45 | 45 | 43 | 43 |
| p-methoxybenzenesulfonamide | 45 | | | |
| p-ethylbenzenesulfonamide | | 45 | 45 | 45 |
| p-n-nonylbenzenesulfonamide | | | 2 | |
| p-n-butylbenzenesulfonamide | | | | 2 |
| Desmophen 650 | 10 | 10 | 10 | 10 |
| Ultranox 626 | 1 | 1 | 1 | 1 |
| dye | <2 | <2 | <2 | <2 |

Various dyes were used in combination with these ink formulations, with good results being obtained with inks containing one dye from the following:
1–1.5 w % Savinyl Black RLS (Sandoz Chemicals), 0.75–1 w % Atlacid Magenta M and 0.6 w % Atlasol Spirit Yellow BB (Atlantic Industries), 1.0 w % Neopren Black X-53, 0.75 w % Basonyl Red 560, and 0.5 w % Neozapon Red 492 (BASF), and 0.3-0.4 w % FD & C Blue #1.

Good results were obtained with all of the above formulations. They all produced inks with good jetting characteristics, and with viscosities within the desired range of 5 to 30 centipoise. However, particularly good results were obtained using the compositions of Examples II-C and D. It was found that the inclusion of a small amount of a $C_3$–$C_9$ alkyl substituted benzenesulfonamide, such as the p-n-nonylbenzenesulfonamide of Example II-C or the p-n-butylbenzenesulfonamide of Example II-D, improved the flexiblity and durability of the resultant print.

The ink described herein has been found particularly useful in connection with a hot-melt ink jet printer using heat-resistant plastic jets. Such jets may be formed from a wide variety of polymer resin materials, but particularly good results were obtained using fluoropolymer resins, such as those sold under the trademark Tefzel by the DuPont Company. Good results were also obtained using a polyetheretherketone material. Such materials have many characteristics that render them advantageous for use in forming ink jets, but may be susceptible to attack by many of the inks that have hitherto been used in jet printing. The present ink does not attack these materials, and is thus highly desirable for use with them, although its application is not so limited.

From the foregoing it will be seen that I have provided an improved ink for ink jet printers. The ink has excellent jetting characteristics, forms a hard, stable print raised above the surface of the substrate, provides high dot resolution, and remains colorfast both in the ink jet printer and on the paper, even when exposed to continued high temperatures. It is non-toxic and odorless, and eminently suitable for office document preparation, among other applications.

I claim:

1. In an ink jet printer ink for jetting through a nozzle, the improvement comprising a solid organic solid having a melting point less than about 150° C. and a thermosetting resin having a hydroxyl number greater than 50.

2. A hot-melt ink according to claim 1 comprising about 60 to 95 parts by weight of said solvent and about 40 to 5 parts by weight of said resin.

3. A hot-melt ink according to claim 2 in which said resin is a saturated polyester resin with a molecular weight of less than about 10,000.

4. A hot-melt ink according to claim 3 in which said resin has an acid number of less than 10.

5. A hot-melt ink according to claim 2 in which said solvent comprises one or more aromatic sulfonamides.

6. A hot-melt ink according to claim 5 in which said solvent comprises one or more primary para-alkylbenzenesulfonamides.

7. A hot-melt ink according to claim 6 in which said solvent comprises p-toluenesulfonamide.

8. A hot-melt ink according to claim 7 in which said solvent comprises a mixture of p-toluenesulfonamide and o-toluenesulfonamide.

9. A hot-melt ink according to claim 7 in which said solvent comprises a mixture of p-toluenesulfonamide and p-ethylbenzenesulfonamide.

10. A hot-melt ink according to claim 9 in which said solvent comprises a mixture of about 40 to 60 parts by weight p-toluenesulfonamide and about 60 to 40 parts by weight p-ethylbenzenesulfonamide.

11. A hot-melt ink according to claim 10 in which said solvent further comprises a $C_3$–$C_9$ alkylbenzenesulfonamide.

12. A hot-melt ink according to claim 11 in which said $C_3$–$C_9$ alkylbenzenesulfonamide is p-n-butyl- or p-n-nonylbenzenesulfonamide.

13. A hot-melt ink according to claim 12 in which said solvent comprises up to about 5 parts by weight p-n-butyl- or p-n-nonylbenzenesulfonamide.

14. A hot-melt ink according to claim 13 in which said solvent comprises a mixture of about 43 parts by weight p-toluenesulfonamide, about 45 parts by weight p-ethylbenzenesulfonamide and about 2 parts by weight p-n-butyl- or p-n-nonylbenzenesulfonamide.

15. A hot-melt ink according to claim 14 in which said resin is a saturated polyester resin with a molecular weight of less than 10,000 and an acid number less than 10.

16. A hot-melt ink according to claim 15 comprising about 90 parts by weight of said solvent and about 10 parts by weight of said resin.

17. A hot-melt ink according to claim 1 further comprising an antioxidant stabilizer.

18. A hot-melt ink according to claim 16 further comprising up to about 1 part by weight of an antioxidant.

19. A hot-melt ink according to claim 1 further comprising a subtractive dye.

20. A hot-melt ink according to claim 19 in which said dye is a color subtractive dye.

21. A hot-melt ink according to claim 18 further comprising a up to about 2 parts by weight of a dye.

22. A hot-melt ink according to claim 21 in which said dye is a color subtractive dye.

23. In an ink jet printer ink for jetting through a nozzle, the improvement comprising a solid organic solvent and polymer resin having a molecular weight of less than 10,000.

24. A hot-melt ink according to claim 23 in which said solid organic solvent has a melting point less than 150° C.

25. A hot-melt ink according to claim 24 in which said solvent comprises one or more aromatic sulfonamides.

* * * * *